(12) United States Patent
Balensiefer et al.

(10) Patent No.: US 7,331,633 B2
(45) Date of Patent: Feb. 19, 2008

(54) JUVENILE VEHICLE SEAT WITH QUICK-CONNECT BACKREST

(75) Inventors: Eugene R. Balensiefer, Seymour, IN (US); Philip W. Burbrink, Columbus, IN (US); Ronald F. Munn, Hope, IN (US); William Horton, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 493 days.

(21) Appl. No.: 10/999,022

(22) Filed: Nov. 29, 2004

(65) Prior Publication Data
US 2006/0138848 A1 Jun. 29, 2006

(51) Int. Cl.
*A47C 7/00* (2006.01)
*A47D 1/10* (2006.01)

(52) U.S. Cl. .................... 297/440.21; 297/440.16; 297/250.1

(58) Field of Classification Search ........... 297/440.16, 297/440.15, 440.12, 250.1
See application file for complete search history.

(56) References Cited

U.S. PATENT DOCUMENTS

| | | | | |
|---|---|---|---|---|
| 1,408,114 A | * | 2/1922 | Mathieu | 297/239 |
| 4,611,852 A | * | 9/1986 | Filer | 297/352 |
| 5,498,065 A | * | 3/1996 | Tosoni | 297/440.21 |
| 5,678,892 A | * | 10/1997 | Heitlinger | 297/344.18 |
| 5,951,102 A | * | 9/1999 | Poulson et al. | 297/130 |
| 6,488,339 B1 | * | 12/2002 | Finner et al. | 297/440.16 |
| 6,991,285 B1 | * | 1/2006 | Hemenway | 297/94 |
| 2004/0070244 A1 | | 4/2004 | Williams et al. | |
| 2004/0124678 A1 | | 7/2004 | Williams et al. | |

FOREIGN PATENT DOCUMENTS

EP   0155784 A2 * 9/1985

* cited by examiner

*Primary Examiner*—Milton Nelson, Jr.
(74) *Attorney, Agent, or Firm*—Barnes & Thornburg LLP

(57) ABSTRACT

A juvenile vehicle seat includes a seat base and a backrest. The backrest is mounted on the seat base and includes a seat back that is retained in an upright fixed seat-forming position relative to a seat bottom included in the seat base.

30 Claims, 6 Drawing Sheets

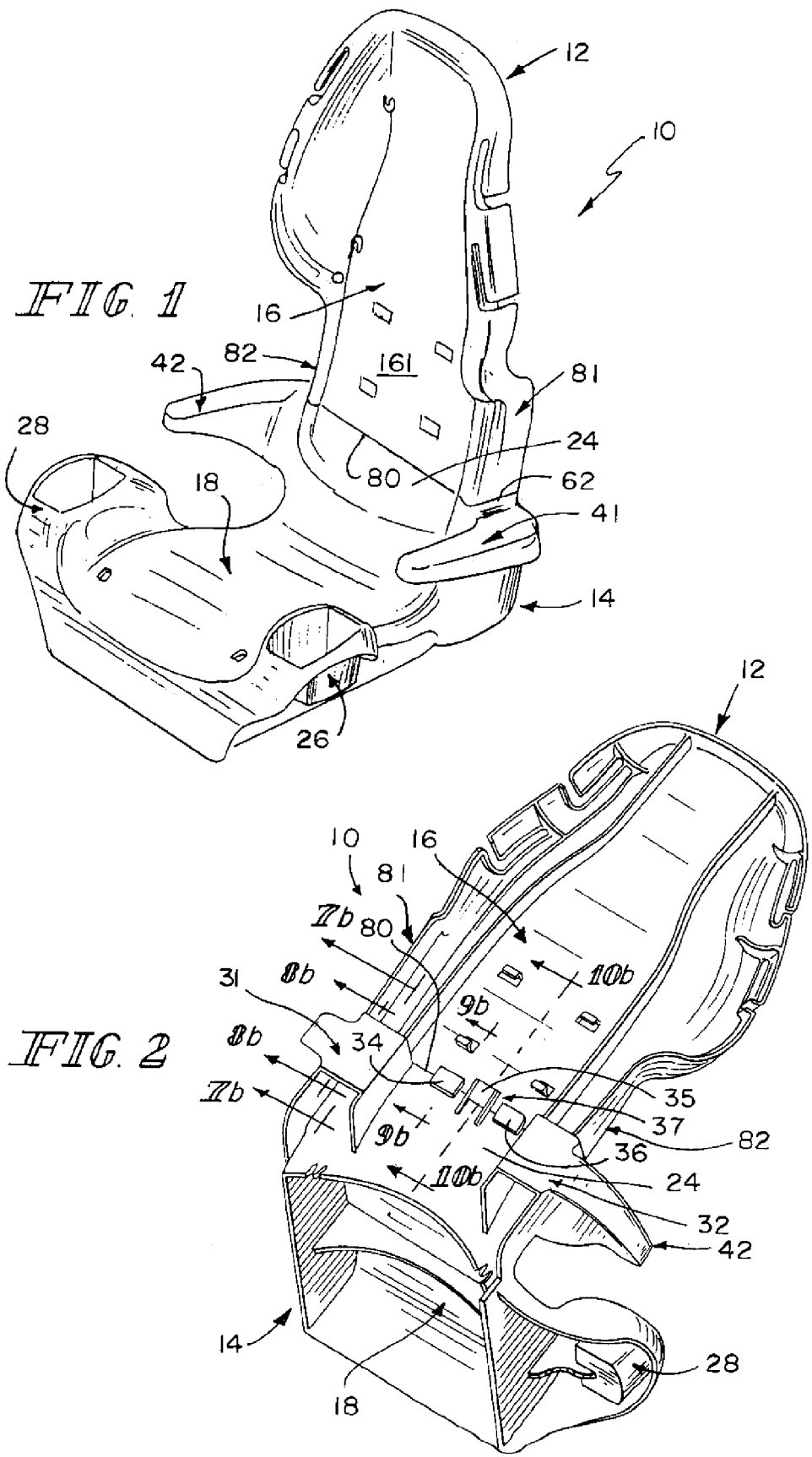

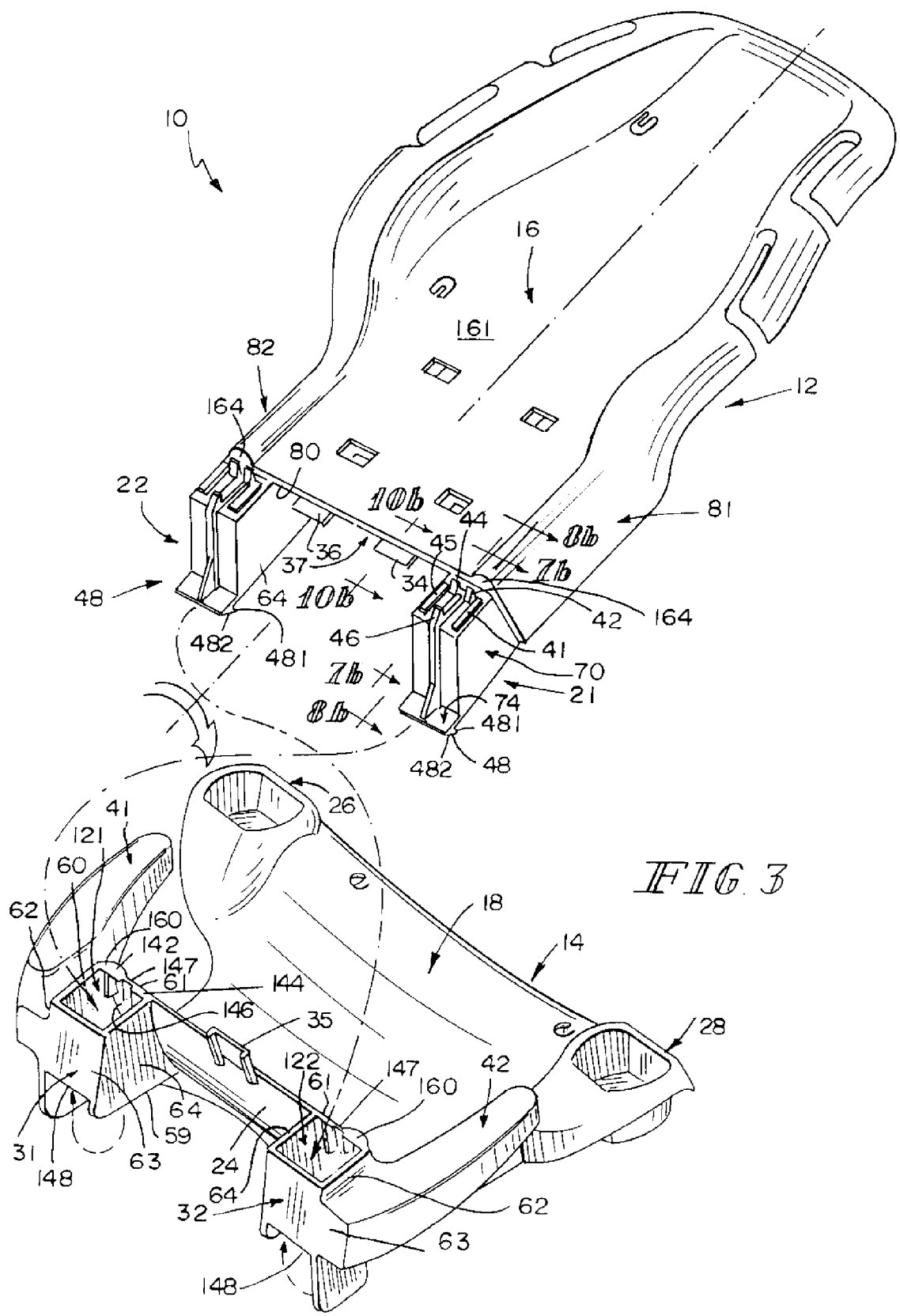

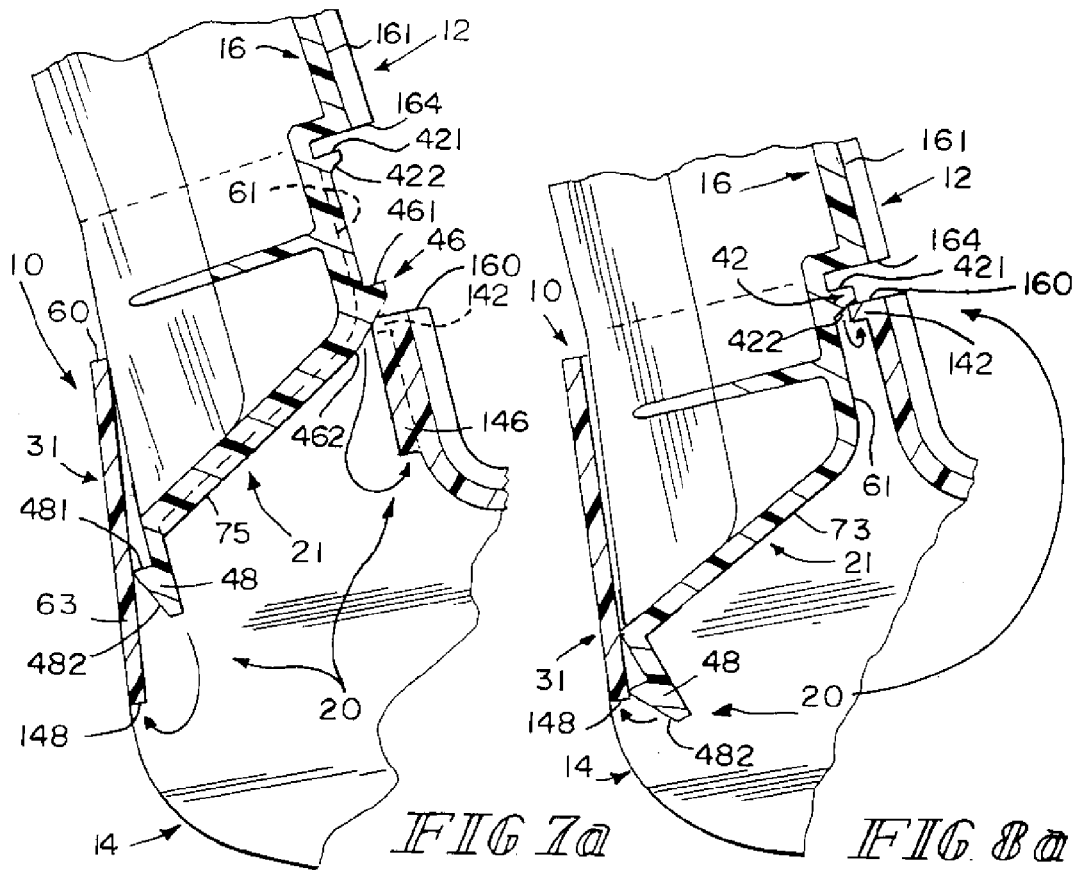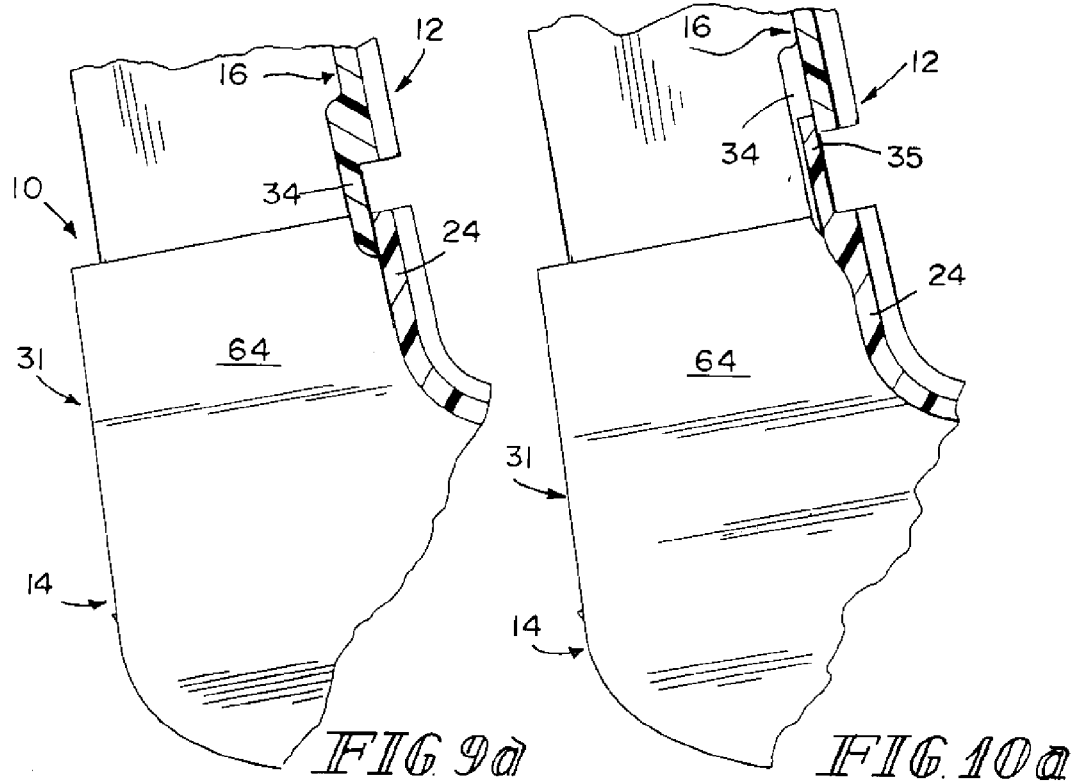

JUVENILE VEHICLE SEAT WITH QUICK-CONNECT BACKREST

BACKGROUND

The present disclosure relates to juvenile vehicle seats, and, in particular, to backrests for juvenile vehicle seats. More particularly, the present disclosure relates to a backrest mounted on a seat base to provide a juvenile vehicle seat.

SUMMARY

A juvenile vehicle seat in accordance with the present disclosure includes a seat base formed to include a seat bottom and a pair of upwardly opening sockets located behind the seat bottom. The juvenile vehicle seat further includes a backrest including a first post extending downwardly into a post-receiving channel formed in the first socket and a second post extending downwardly into a post-receiving channel formed in the second socket. Each post is anchored to its companion socket to orient a seat back included in the backrest in an upright fixed seat-forming position relative to the seat bottom included in the seat base.

In illustrative embodiments, the seat base includes a lower seat back extending upwardly from the seat bottom. The first and second sockets are coupled to a rearwardly facing portion of the lower seat back and located in spaced-apart relation to one another. The seat base also includes a first armrest coupled to the first socket and a second armrest coupled to the second socket and arranged to lie in spaced-apart relation to the first armrest to locate the seat bottom therebetween.

In illustrative embodiments, the backrest includes an upper seat back. The first and second posts are coupled to the upper seat back and arranged to extend downwardly into the post-receiving channels formed in the first and second sockets. When the backrest is mounted rigidly on the seat base by mating the posts and sockets, the upper seat back of the backrest and the lower seat back and seat bottom of the seat base cooperate to define a juvenile seating surface on the juvenile vehicle seat.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 1 is a "top" front perspective view of a juvenile vehicle seat in accordance with the present disclosure showing a backrest coupled to a base;

FIG. 2 is a "bottom" rear perspective view of the juvenile vehicle seat of FIG. 1;

FIG. 3 is an enlarged perspective assembly view of the seat of FIGS. 1 and 2 showing two posts included in the backrest and two post-receiving sockets included in the base and suggesting a first stage of backrest assembly characterized by rotation of the backrest about a longitudinal axis thereof to assume the assembly position shown in FIG. 4 so that each post in the backrest is "matched" with a "companion" socket in the base;

FIGS. 7*a*, 8*a*, 9*a*, and 10*a* show the first post of FIG. 5 as it is being inserted into the first socket of FIG. 6;

FIG. 7*a* is an enlarged sectional view taken along line 7*b*-7*b* of FIGS. 2, 3, and 6 during coupling of the backrest to the base in the manner suggested in FIG. 4;

FIG. 8*a* is an enlarged sectional view taken along line 8*b*-8*b* of FIGS. 2, 3, and 6 during coupling of the backrest to the base in the manner suggested in FIG. 4;

FIG. 9*a* is an enlarged sectional view taken along line 9*b*-9*b* of FIG. 2 during coupling of the backrest to the base in the manner suggested in FIG. 4;

FIG. 10*a* is an enlarged sectional view taken along line 10*b*-10*b* of FIGS. 2 and 3 during coupling of the backrest to the base in the manner suggested in FIG. 4;

FIG. 7*b* is an enlarged sectional view taken along line 7*b*-7*b* of FIGS. 2, 3, and 6;

FIG. 8*b* is an enlarged sectional view taken along line 8*b*-8*b* of FIGS. 2, 3, and 6;

FIG. 9*b* is an enlarged sectional view taken along line 9*b*-9*b* of FIGS. 2 and 3; and FIG. 10*b* is an enlarged sectional view taken along line 10*b*-10*b* of FIGS. 2 and 3.

DETAILED DESCRIPTION

Figure 4:
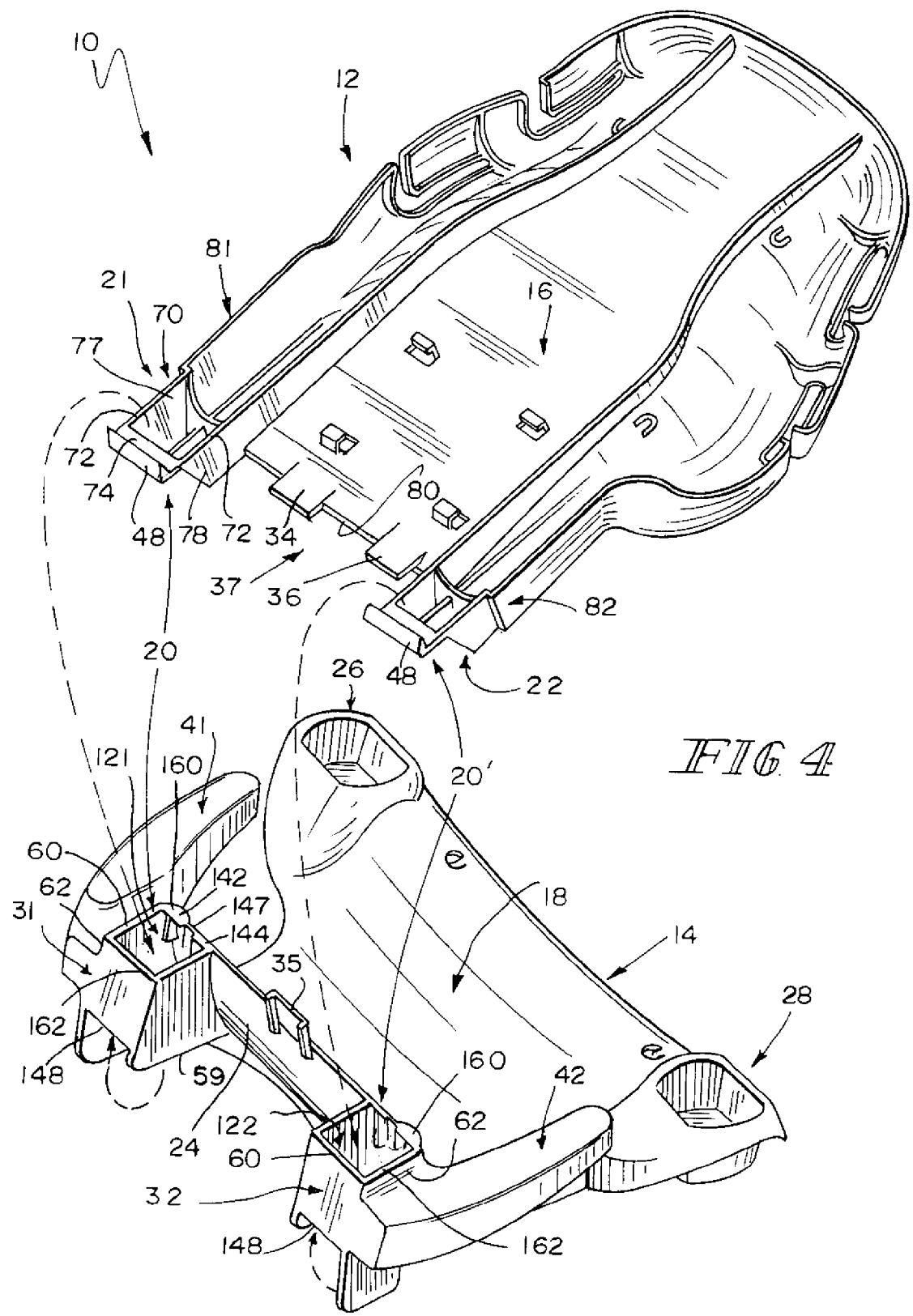
FIG. 4 is a perspective assembly view similar to FIG. 3 showing a second stage of backrest assembly characterized by movement of the backrest toward the base to cause (1) a first post in the backrest to extend into and mate with a first socket in the base and (2) a second post in the backrest to extend into and mate with a second socket in the base.

A juvenile vehicle seat 10 includes a backrest 12 that can be coupled to a seat base 14 as suggested, for example, in FIG. 4 to produce a seating surface as shown, for example, in FIG. 1. Posts 21, 22 included in backrest 12 mate with sockets 31, 32 included in seat base 14 to orient backrest 12 in an upright seat-forming position. This two-part seat 10 can be shipped in an unassembled state (shown, for example, in FIG. 3) in a relatively small carton containing a backrest 12 and a seat base 14 and later assembled by a purchaser.

As shown best in FIG. 3, backrest 12 includes a seat back 16 and first and second posts 21 are coupled to seat back 16. Seat base 14 includes a seat bottom 18 and first and second sockets 31, 32 are located in fixed positions relative to and behind seat bottom 18.

Figure 5:
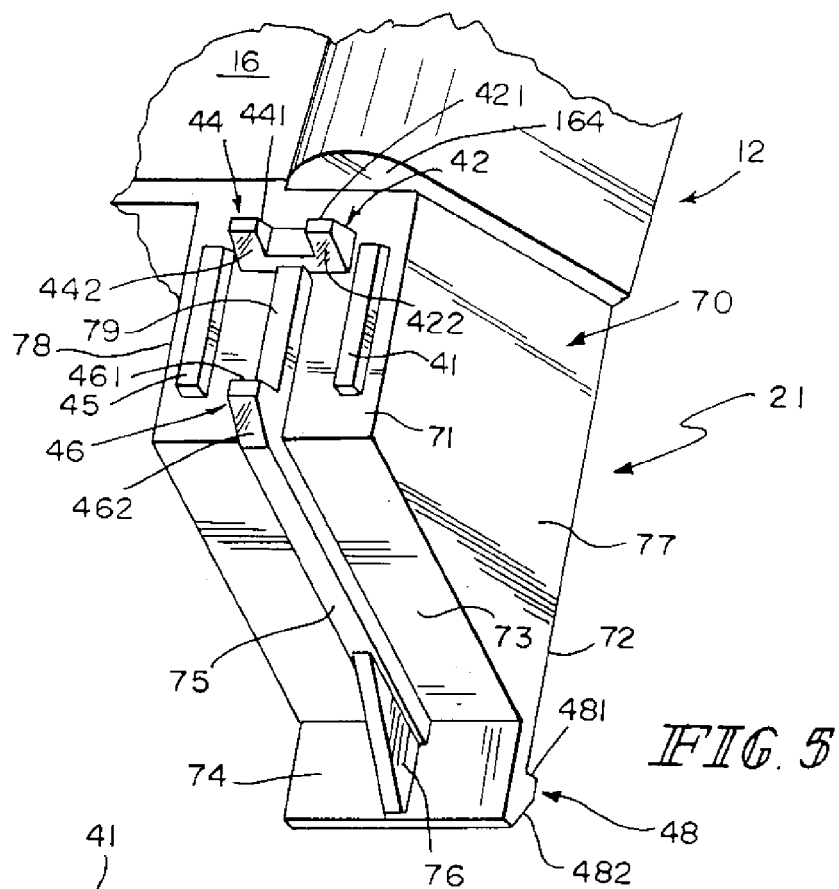
FIG. 5 is an enlarged perspective view of a first of the posts included in the backrest of FIGS. 1-4 showing the configuration and location of various illustrative post "ridges" and "retainers" included in the first post.
Figure 6:
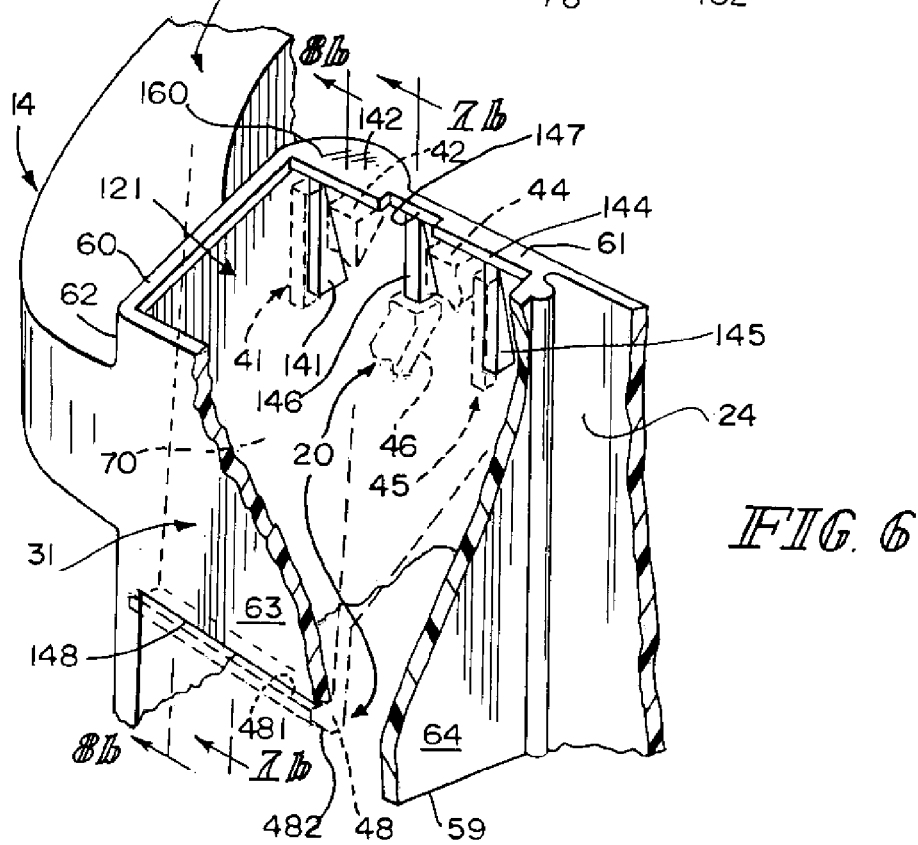
FIG. 6 is an enlarged perspective view, with portions broken away, of a first of the sockets included in the base of FIGS. 1-4 showing (in phantom) the post of FIG. 5 extending into and mating with the first socket and showing mating engagement of the post ridges and retainers included in the first post with companion "ridge supports" and "retainer flanges" included in the first socket.

In the illustrated embodiment, anchor means 20 is provided for anchoring first post 21 in a post-receiving channel 121 formed in socket 31 as suggested, for example, in FIG. 6 to retain seat back 16 in an upright fixed seat-forming position relative to seat bottom 18 as shown, for example, in FIGS. 1 and 2. Anchor means 20 includes various retainers 42, 44, 46, 48 (shown in phantom in FIG. 6) coupled to first post 21 and various "companion" retainer flanges 142, 144, 146, 148 (shown in solid in FIG. 6) coupled to first socket 31 and configured to mate with the retainers coupled to first post 21. These retainers and flanges are shown in more detail in FIGS. 3, 5, and 7-10. Similar anchor means 20' is provided for anchoring second post 22 in a post-receiving channel 122 formed in socket 32 as suggested in FIG. 4.

Seat base 14 further includes a lower seat back 24 shown, for example, in FIGS. 1-3. In the illustrated embodiment, lower seat back 24 is located between and coupled to each of first and second sockets 31, 32 as suggested in FIG. 3. Lower seat back 24 is arranged to extend upwardly from seat bottom 18 in a direction toward seat back 16 of backrest 12 as shown in FIG. 1. As suggested in FIG. 1, seat back 16 of backrest 12 functions as an "upper" seat back and cooperates with lower seat back 24 and seat bottom 18 to provide a seating surface for a child (not shown) seated on juvenile vehicle seat 10. In the illustrated embodiment, upper seat back 16 of backrest 12 is arranged to lie adjacent to and contact lower seat back 24 of seat base 14 when backrest 12 is mounted on seat base 14.

Seat base 14 further includes first and second armrests 41, 42 arranged to extend in a forward direction relative to and away from backrest 12 as suggested in FIG. 1. Seat bottom 18 is arranged to lie below and between first and second armrests 41, 42. In the illustrated embodiment, first armrest 41 is coupled to first socket 31 and second armrest 42 is coupled to second socket 32. In the illustrated embodiment, seat base 14 is a monolithic element made of a suitable plastics material.

Seat base 14 is also formed to include a first cup holder 26 and a second cup holder 28 arranged to lie in spaced-apart relation to first cup holder 26 to locate seat bottom 18 therebetween. Reference is hereby made to a U.S. patent application entitled "Juvenile Vehicle Seat Base with Cup Holder," filed on Nov. 29, 2004, which is hereby incorporated by reference herein, for a disclosure of a suitable seat base.

Figures 9B, 10B:
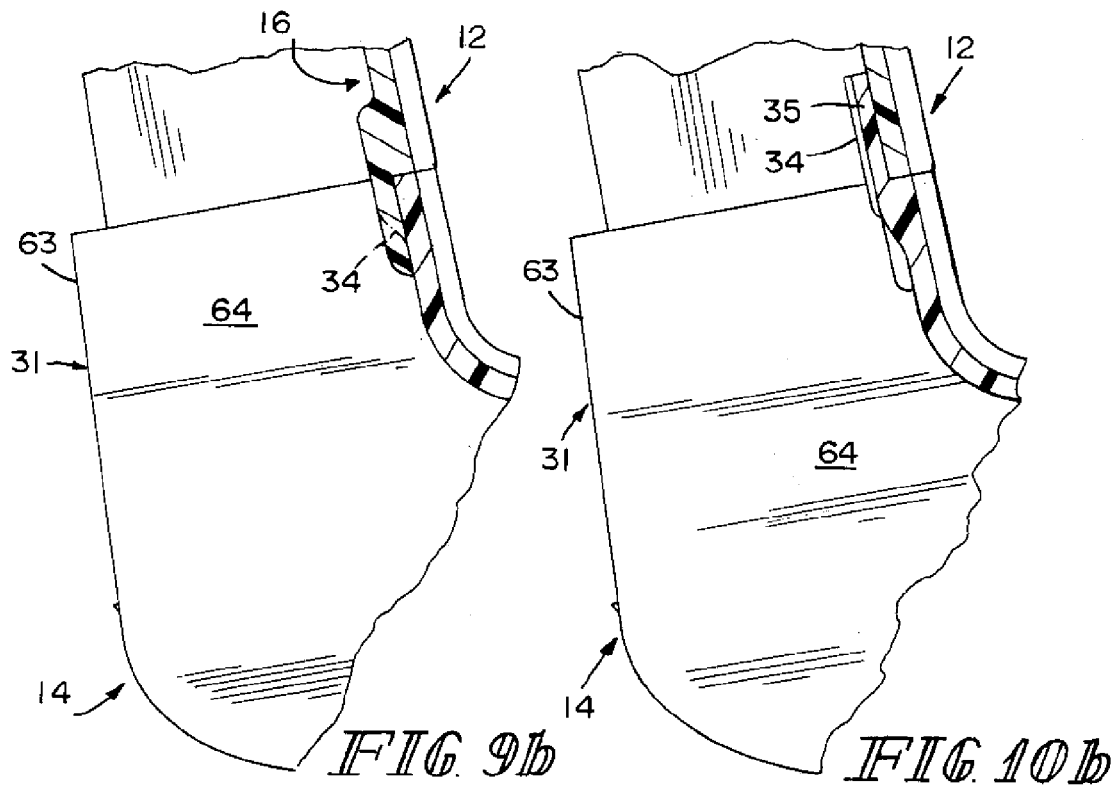

Backrest 12 also includes spaced-apart first and second alignment tabs 34, 36 arranged to extend downwardly from upper seat back 16 to engage lower seat back 24 of seat base 14 as suggested in FIGS. 2, 4, and 9b. Seat base 14 includes a central alignment tab 35 arranged to extend upwardly from lower seat back 24 into a space 37 formed between first and second alignment tabs 34, 36 as suggested in FIGS. 2, 4, and 10b to orient lower seat back 24 and upper seat back 16 in an "in-line" relation to retain upper seat back 16 in the upright seat-forming position as suggested in FIGS. 1 and 2. As suggested in FIG. 2, first, central, and second alignment tabs 34, 35, 36 are located in a space between first and second sockets 31, 32 when upper seat back 16 is oriented to lie in the upright seat-forming position relative to seat bottom 18 as shown, for example, in FIG. 2. First and second alignment tabs 34, 36 contact a rearwardly facing surface of lower seat back 24 while central alignment tab 35 contacts a rearwardly facing surface of upper seat back 16 as shown in FIG. 2.

Referring now to FIGS. 5 and 6, it will be seen that anchor means 20 includes, on first post 21, a first front upper retainer 42, a second front upper retainer 44, a front lower retainer 46, and a rear retainer 48. Anchor means 20 also includes, on first socket 31, a first front upper retainer flange 142, a second front upper retainer flange 144, a front lower retainer flange 146, and a rear retainer flange 148 as shown in FIG. 6. Engagement of each retainer on first post 21 and a companion retainer flange on first socket 31 to anchor first post 21 in post-receiving channel 121 formed in first socket 31 is shown, for example, in FIGS. 6, 7a, 8a, 7b, and 8b and described below. As suggested in FIGS. 3 and 4, second post 22 includes flanges similar to those included in first post 21 and second socket 32 includes retainer flanges similar to those included in first socket 31.

Front lower retainer 46 is coupled to a front wall 71 of first post 21 and arranged to lie in spaced-apart relation to upper seat back 16 of backrest 12 as suggested in FIG. 5. First and second front upper retainers 42, 44 are also coupled to front wall 71 of first post 21 and arranged to lie between front lower retainer 46 and upper seat back 16 as also shown in FIG. 5.

Front lower retainer flange 146 is coupled to seat base 14 and arranged to lie in post-receiving channel 121 to mate with front lower retainer 46 as suggested in FIG. 6 to block removal of first post 21 from post-receiving channel 121. In the illustrated embodiment, front lower retainer flange 146 has a triangular shape and is cantilevered to a front wall 61 of first socket 31 to project from front wall 61 into post-receiving channel 121 as shown best in FIG. 6. An uppermost portion of front lower retainer flange 146 merges with an edge of first socket 31 defining a boundary of a retainer channel means 147 formed between first and second front upper retainer flanges 142, 144 and "bisects" space 147.

Front lower retainer 46 includes a stop face 461 and a ramp 462 as shown in Fig. 5. Stop face 461 is arranged to mate with a downwardly facing surface on front lower retainer flange 146 as suggested in FIGS. 6 and 8b when backrest 12 is mounted on seat base 14 to block movement of first post 21 in an upward direction out of post-receiving channel 121. Ramp 462 provides means for riding on a vertically extending surface on lower retainer flange 146 as first post 21 is moved into post-receiving channel 121 in a downward direction opposite to the upward direction as suggested in FIG. 7a to move stop face 461 past front lower retainer flange 146 and into post-receiving channel 121 to lie under and mate with front lower retainer flange 146 so that removal of first post 21 from post-receiving channel 121 formed in first socket 31 is blocked. First and second front upper retainer flanges 142, 144 are arranged to lie in spaced-apart relation to define therebetween retainer channel means 147 as shown in FIG. 6 for receiving front lower retainer 46 temporarily therein as first post 21 is inserted into post-receiving channel 121 and front lower retainer 46 is moved downwardly in post-receiving channel 121 to mate with the downwardly facing surface on front lower retainer flange 146.

First front upper retainer flange 142 on seat base 14 is cantilevered to front wall 61 of first socket 31 and arranged to extend in a rearward direction away from seat bottom 18 to mate with first front upper retainer 42 on backrest 12 to block removal of first post 21 from post-receiving channel 121 formed in first socket 31. First front upper retainer 42 includes a stop face 421 and a ramp 422 as shown in FIGS. 5 and 6. Stop face 421 is arranged to mate with a downwardly facing surface on first front upper retainer flange 142 to block movement of first post 21 in an upward direction out of post-receiving channel 121. Ramp 422 provides means for riding on a vertically extending surface on first front upper retainer flange 142 as first post 21 is moved into post-receiving channel 121 in a downward direction opposite to the upward direction as suggested in FIG. 8a to move stop face 421 past first front upper retainer flange 142 and into post-receiving channel 121 to lie under and mate with the downwardly facing surface on first front upper retainer flange 142 so that removal of first post 21 from post-receiving channel 121 formed in first socket 31 is blocked.

Second front upper retainer flange 144 on seat base 14 is cantilevered to front wall 61 of first socket 31 and arranged to extend in a rearward direction away from seat bottom 18 to mate with second front upper retainer 44 on backrest 12 to block removal of first post 21 from post-receiving channel 121 formed in first socket 31. Second front upper retainer 42 includes a stop face 441 and a ramp 442 as shown in FIGS. 5 and 6. Stop face 441 is arranged to mate with a downwardly facing surface on second front upper retainer flange 144 to block movement of first post 21 in an upward direction out of post-receiving channel 121. Ramp 442 provides means for riding on a vertically extending surface on second front upper retainer flange 144 as first post 21 is moved into post-receiving channel 121 in a downward direction opposite to the upward direction to move stop face 441 past second front upper retainer flange 144 and into post-receiving channel 121 to lie under and mate with the downwardly facing surface on second front upper retainer flange 144 so that removal of first post 21 from post-receiving channel 121 formed in first socket 31 is blocked.

As shown, for example, in FIG. 5, first and second ridges 41, 45 are coupled to a front wall 71 of first post 21 and arranged to lie in spaced-apart relation to one another to locate first and second front upper retainers 42, 44 and front lower retainer 46 therebetween. These ridges 41, 45 project away from front wall 71 of first post 21 in the same direction as retainers 42, 44, 46; however, ridges 41, 45 have a relatively smaller "depth" as compared to retainers 42, 44, 46 and do not project as far away from front wall 71.

As shown, for example, in FIG. 6, first and second ridge supports 141, 145 are cantilevered to front wall 61 of first socket 31 and arranged to extend in a rearward direction away from seat bottom 18. First ridge support 141 includes a vertically extending surface that mates with a rearwardly facing, vertically extending surface on first ridge 41 when first post 21 is retained in first socket 31. Second ridge support 145 includes a vertically extending surface that mates with a rearwardly facing, vertically extending surface on second ridge 45 when first post 21 is retained in first socket 31.

As shown in FIGS. 4 and 5, first post 21 includes a trapezoidal block 70 having a front wall 71, rear edges 72, and an inclined bottom wall 73 and a downwardly extending tab 74 coupled to trapezoidal block 70. Retainers 42, 44, 46 and ridges 41, 45 are coupled to front wall 71. Retainer 48 is coupled to tab 74 and is arranged to extend in an opposite direction as compared to retainers 42, 44, 46 and ridges 41, 45. A rigidifying strip 75 is coupled to inclined bottom wall 73 and arranged to extend from retainer 46 to tab 74. A rigidifying wedge 76 has a triangular shape and is coupled to strip 75 and to tab 74 to rigidify tab 74. A rigidifying strip 79 is coupled to front wall 71 and is arranged to extend upwardly from retainer 46 to a point located between retainers 42 and 44 as shown in FIG. 5. Block 70 also includes side walls 77, 78 and an upper portion of block 70 has a rectangular cross-sectional shape owing to the "rectangular" arrangement of edges 72 and walls 71, 77, and 70 as suggested in FIG. 5.

As suggested in FIGS. 4 and 6, first socket 31 includes a top perimeter edge 60 defining a top aperture opening into post-receiving channel 121 and receiving first post 21 therein during insertion of first post 21 into post-receiving channel 121. First socket 31 also includes a bottom perimeter edge 59 defining a bottom aperture opening into post-receiving channel 121. A portion of bottom perimeter edge 59 defines rear retainer flange 148 included in anchor means 20. Second socket 32 is configured in a manner similar to first socket 31.

First socket 31 includes a front wall 61 positioned to lie adjacent to seat bottom 18, a rear wall 63 arranged to lie in spaced-apart relation to front wall 61, a first or outer side wall 62 arranged to interconnect front and rear walls 61, 63, and a second or inner side wall 64 arranged to interconnect front and rear walls 61, 63 and to face toward second socket 32 as shown in FIGS. 3 and 6. These walls 61, 62, 63, 64 cooperate to define post-receiving channel 121 therein and provide channel 121 with a "rectangular" shape adapted to receive first post 21 in closely fitting relation therein as shown, for example, in FIGS. 3 and 4. In the illustrated embodiment, first armrest 41 is coupled to outer side wall 62 of first socket 31 and second armrest 42 is coupled to outer side wall 62 of second socket 32. Inner side wall 64 of second socket 32 is arranged to face toward first socket 31 as suggested in FIG. 3. As shown, for example, in FIGS. 7a, 8a, 7b, and 8b, socket wall 63 borders post-receiving channel 121 and provides a bottom edge defining retainer flange 148.

Figures 7B, 8B:
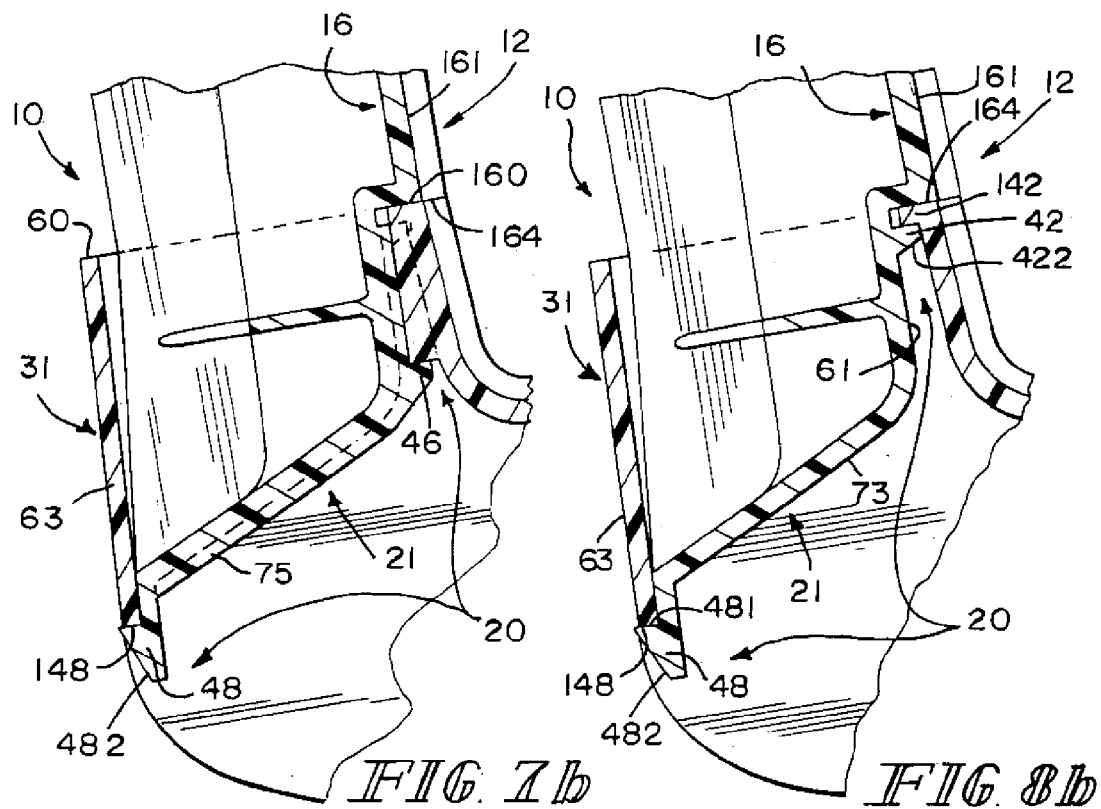
FIGS. 7*b*, 8*b*, 9*b*, and 10*b* show the first post of FIG. 5 after it has been inserted into and mated with the first socket of FIG. 6.

Each of first and second sockets 31, 32 includes a top wall 160 having a top perimeter edge 60 defining a top aperture opening into post-receiving channel 121, 122, respectively, as shown, for example, in FIGS. 4, 7a, and 7b. Seat back 16 includes a downwardly facing wall 164 arranged to mate with top wall 160 of first socket 31 (and second socket 32) as suggested in FIGS. 5, 6, 7a, 7b, 8a, and 8b upon movement of first post 21 in post-receiving channel 121 to cause retainer 48 coupled to first post 21 to mate with retainer flange 148 included in first socket 31 (and upon movement of second post 22 in post-receiving channel 122 to cause retainer 48 coupled to second post 22 to mate with retainer flange 148 included in second socket 32).

Seat back 16 further includes a front surface 161 facing toward a front edge 181 of seat bottom 18 as suggested in FIGS. 1 and 7a. Downwardly-facing wall 164 included in seat back 16 extends between first post 21 and front surface 161 of seat back 16 as shown, for example, in FIGS. 5 and 7a.

Each retainer 48 includes a stop face 481 and a ramp 482 as shown, for example, in FIGS. 4-6, 7a, 7b, 8a, and 8b. Stop face 481 is arranged to mate with its companion retainer flange 148 to block movement to first post 31 in an upward direction out of post-receiving channel 121. Ramp 482 provides means for riding on socket wall 63 as first post 31 is moved into post-receiving channel 121 in a downward direction opposite to the upward direction to move stop face 481 past retainer flange 148 to lie under and mate with retainer flange 148 so that removal of first post 31 from post-receiving channel 121 formed in first socket 31 is blocked.

As suggested in FIG. 4, upper seat back 16 of backrest 12 includes a horizontally extending bottom edge 80 facing toward seat base 14 and first and second perimeter side edges 81, 82 extending upwardly from outermost portions of horizontally extending bottom edge 80. In the illustrated embodiment, first post 21 is coupled to upper seat back 16 at a first corner established by the intersection of horizontally extending bottom edge 80 and first perimeter side edge 81. Second post 21 is coupled to upper seat back 16 at a second corner established by the intersection of horizontally extending bottom edge 80 and second perimeter side edge 82.

The invention claimed is:

1. A juvenile vehicle seat comprising
   a seat base including a seat bottom and a first socket located in a fixed position relative to the seat bottom, the first socket being formed to include a post-receiving channel, a backrest including a seat back and a first post coupled to the seat back and arranged to extend into the post-receiving channel formed in the first socket to orient the seat back in an upright fixed seat-forming position relative to the seat bottom, and anchor means for anchoring the first post in the post-receiving channel formed in the first socket to retain the seat back in the upright fixed seat-forming position, wherein the anchor means is located in the post-receiving channel formed in the first socket and wherein the anchor means includes a retainer flange coupled to the seat base and arranged to extend into the post-receiving channel and a retainer coupled to the first post and arranged to mate with the retainer flange to block removal of the first post from the post-receiving channel formed in the first socket without blocking insertion of the first post into the post-receiving channel.

2. A juvenile vehicle seat comprising a seat base including a seat bottom and a first socket located in a fixed position relative to the seat bottom, the first socket being formed to include a post-receiving channel, a backrest including a seat back and a first post coupled to the seat back and arranged to extend into the post-receiving channel formed in the first socket to orient the seat back in an upright fixed seat-forming position relative to the seat bottom, and anchor means for anchoring the first post in the post-receiving channel formed in the first socket to retain the seat back in the upright fixed seat-forming position, wherein the anchor means is located in the post-receiving channel formed in the first socket and wherein the anchor means includes a front lower retainer coupled to the first post and arranged to lie in spaced-apart relation to the seat back, first and second front upper retainers coupled to the first post and arranged to lie between the front lower retainer and the seat back, a front lower retainer flange coupled to the seat base and arranged to lie in the post-receiving channel to mate with the front lower retainer to block removal of the first post from the post-receiving channel, and first and second front upper retainer flanges coupled to the seat base and arranged to lie in spaced-apart relation to one another to define therebetween retainer channel means for receiving the front lower retainer temporarily therein as the first post is inserted into the post-receiving channel and to mate with the first and second front upper retainer flanges, respectively, to block removal of the first post from the post-receiving channel.

3. The seat of claim 2, wherein the first front upper retainer includes a stop face arranged to mate with the first front upper retainer flange to block movement of the first post in an upward direction out of the post-receiving channel and ramp means for riding on the first front upper retainer flange as the first post is moved into the post-receiving channel in a downward direction opposite to the upward direction to move the stop face past the first front upper retainer flange and into the post-receiving channel to lie under and mate with the first front upper retainer flange so that removal of the first post from the post-receiving channel formed in the first socket is blocked.

4. The seat of claim 3, wherein the second front upper retainer includes a stop face arranged to mate with the second front upper retainer flange to block movement of the first post in an upward direction out of the post-receiving channel and ramp means for riding on the second front upper retainer flange as the first post is moved into the post-receiving channel in a downward direction opposite to the upward direction to move the stop face past the second front upper retainer flange and into the post-receiving channel to lie under and mate with the second front upper retainer flange so that removal of the first post from the post-receiving channel formed in the first socket is blocked.

5. The seat of claim 2, wherein the front lower retainer includes a stop face arranged to mate with the front lower retainer flange to block movement of the first post in an upward direction out of the post-receiving channel and ramp means for riding on the front lower retainer flange as the first post is moved into the post-receiving channel in a downward direction opposite to the upward direction to move the stop face past the front lower retainer flange and into the post-receiving channel to lie under and mate with the front lower retainer flange so that removal of the first post from the post-receiving channel formed in the first socket is blocked.

6. A juvenile vehicle seatcomprising a seat base including a seat bottom and a first socket located in a fixed position relative to the seat bottom, the first socket being formed to include a post-receiving channel, a backrest including a seat back and a first post coupled to the seat back and arranged to extend into the post-receiving channel formed in the first socket to orient the seat back in an upright fixed seat-forming position relative to the seat bottom, and anchor means for anchoring the first post in the post-receiving channel formed in the first socket to retain the seat back in the upright fixed seat-forming position, wherein the anchor means includes a retainer flange coupled to the seat base and arranged to extend into the post-receiving channel and a retainer coupled to the first post and arranged to mate with the retainer flange to block removal of the First post from the post-receiving channel formed in the first socket without blocking insertion of the first post into the post-receiving channel.

7. The seat of claim 6, wherein the first socket includes a top perimeter edge defining a top aperture opening into the post-receiving channel and receiving the first post therein during insertion of the first post into the post-receiving channel and a spaced-apart bottom perimeter edge defining a bottom aperture opening into the post-receiving channel and a portion of the bottom perimeter edge defines the retainer flange included in the anchor means.

8. The seat of claim 7, wherein the first socket includes a front wall positioned to lie adjacent to the seat bottom, a rear wall arranged to lie in spaced-apart relation to the front wall, a first side wall arranged to interconnect the front and rear walls, and a second side wall arranged to lie in spaced-apart relation and arranged to interconnect the front and rear walls to define the post-receiving channel between the front, rear, and first and second side walls, and wherein the portion of the bottom perimeter edge defining the retainer flange is included in the rear wall and the retainer flange is arranged to extend in a direction away from the seat bottom to mate with the retainer flange provided by the bottom perimeter edge of the first socket.

9. The seat of claim 6, wherein the retainer includes a stop face arranged to mate with the retainer flange to block movement of the first post in an upward direction out of the post-receiving channel and ramp means for riding on the retainer flange as the post is moved into the post-receiving channel in a downward direction opposite to the upward direction to move the stop face past the retainer flange and into the post-receiving channel to lie under and mate with the retainer flange so that removal of the first post from the post-receiving channel formed in the first socket is blocked.

10. The seat of claim 6, wherein the retainer flange extends in a rearward direction away from the seat bottom.

11. The seat of claim 6, wherein the first socket includes a top perimeter edge defining a top aperture opening into the post-receiving channel and receiving the first post therein during insertion of the first post into the post-receiving channel and a spaced-apart bottom perimeter edge defining a bottom aperture opening into the post-receiving channel and the retainer flange is located at the top perimeter edge.

12. The seat of claim 11, wherein the anchor means further includes another retainer coupled to the first post and arranged to mate with a portion of the bottom perimeter edge of the first socket to block removal of the first post from the post-receiving channel formed in the first socket.

13. A juvenile vehicle seat comprising
a seat base including a seat bottom and a first socket located in a fixed position relative to the seat bottom, the first socket being formed to include a post-receiving channel,
a backrest including a seat back and a first post coupled to the seat back and arranged to extend into the post-receiving channel formed in the first socket to orient the seat back in an upright fixed seat-forming position relative to the seat bottom, and
anchor means for anchoring the first post in the post-receiving channel formed in the first socket to retain the seat back in the upright fixed seat-forming position, wherein the seat base further includes a lower seat back extending upwardly from a rear edge of the seat bottom to mate with the seat back of the backrest and the first socket is coupled to the lower seat back, and wherein the backrest includes spaced-apart first and second alignment tabs arranged to extend downwardly from the seat back of the backrest to engage the lower seat back and the seat base includes a central alignment tab arranged to extend upwardly from the lower seat back into a space formed between the first and second alignment tabs to orient the lower seat back and the seat back in an in-line relation to retain the seat back in the upright fixed seat-forming position.

14. A juvenile vehicle seat comprising
a seat base including a seat bottom and a first socket located in a fixed position relative to the seat bottom, the first socket being formed to include a post-receiving channel,
a backrest including a seat back and a first post coupled to the seat back and arranged to extend into the post-receiving channel formed in the first socket to orient the seat back in an upright fixed seat-forming position relative to the seat bottom, and
anchor means for anchoring the first post in the post-receiving channel formed in the first socket to retain the seat back in the upright fixed seat-forming position, wherein the seat base includes a first armrest, the first socket includes a front wall arranged to extend upwardly from the seat bottom and formed to include a portion of the anchor means and an outer side wall arranged to cooperate with the front wall to bound a portion of the post-receiving channel, and the first armrest is coupled to the outer side wall of the first socket to lie in an elevated position above the seat bottom.

15. The seat of claim 14, wherein the seat back of the backrest includes a horizontally extending bottom edge facing toward the seat base and first and second perimeter side edges extending upwardly from outermost portions of the horizontally extending bottom edge and wherein the first post is coupled to the seat back at a corner established by the intersection of the horizontally extending bottom edge and the first perimeter side edge.

16. The seat of claim 15, wherein the seat base further includes a second socket located in a fixed position relative to the seat bottom in spaced-apart relation to the first socket and formed to receive a post-receiving channel and the backrest includes a second post coupled to the seat back of the backrest at a corner established by the intersection of the horizontally extending bottom edge and the second perimeter side edge, and the second post is arranged to extend into the post-receiving channel formed in the second socket.

17. The seat of claim 16, further comprising anchor means for anchoring the second post in the post-receiving channel formed in the second socket to retain the seat back of the backrest in the upright fixed seat-forming position.

18. The seat of claim 16, wherein the seat base further includes a second armrest coupled to the second socket and arranged to lie in spaced-apart relation to the first armrest to locate the seat bottom therebetween.

19. A juvenile vehicle seat comprising
a seat base including a seat bottom, a first socket coupled to a rear portion of the seat bottom and formed to include a first post-receiving channel, and a second socket coupled to the rear portion of the seat bottom and formed to include a second post-receiving channel, and
a backrest including an upper seat back, a first post coupled to the upper seat back, and a second post coupled to the upper seat back, and wherein the first post extends into the first post-receiving channel formed in the first socket and the second post extends into the second post-receiving channel formed in the second socket to orient the upper seat back in an upright seat-forming position relative to the seat bottom and block pivotable movement of the backrest relative to the seat base, wherein the seat base further includes a lower seat back located between the first and second sockets and arranged to extend upwardly from the seat bottom in a direction toward the upper seat back and wherein the backrest includes spaced-apart first and second alignment tabs arranged to extend downwardly from the seat back of the backrest to engage the lower seat back and the seat base includes a central alignment tab arranged to extend upwardly from the lower seat back into a space formed between the first and second alignment tabs to orient the lower seat back and the upper seat back in an in-line relation to retain the upper seat back in the upright seat-forming position.

20. The seat of claim 19, wherein the first, second, and central alignment tabs are located in a space between the first and second sockets when the upper seat back is oriented to lie in the upright seat-forming position relative to the seat bottom.

21. The seat of claim 19, wherein the seat base further includes a first armrest coupled to the first socket and a second armrest coupled to the second socket and arranged to lie in spaced-apart relation to the first armrest to locate the seat bottom therebetween.

22. A juvenile vehicle seat comprising
a seat base including a seat bottom, a first socket coupled to a rear portion of the seat bottom and formed to include a first post-receiving channel, and a second socket coupled to the rear portion of the seat bottom and formed to include a second post-receiving channel, and a backrest including an upper seat back, a first post coupled to the upper seat back, and a second post coupled to the upper seat back, and wherein the first post extends into the first post-receiving channel formed in the first socket and the second post extends into the second post-receiving channel formed in the second socket to orient the upper seat back in an upright seat-forming position relative to the seat bottom and block pivotable movement of the backrest relative to the seat base, wherein the seat base further includes a first armrest coupled to the first socket and a second armrest coupled to the second socket and arranged to lie in spaced-apart relation to the first armrest to locate the seat bottom therebetween, and wherein the first socket includes a front wall arranged to extend upwardly from the seat bottom, a rear wall located in spaced-apart relation to the front wall of the first socket, an inner side wall arranged to interconnect the front and rear walls of the first socket and face toward the second socket, and an outer side wall arranged to interconnect the front and rear walls of the first socket and lie in spaced-apart relation to the inner side wall of the first socket to define the post-receiving channel of the first socket therebetween, and wherein the first armrest is coupled to the outer side wall of the first socket.

23. The seat of claim 22, wherein the second socket includes a front wall arranged to extend upwardly from the seat bottom, a rear wall located in spaced-apart relation to the front wall of the second socket, an inner side wall arranged to interconnect the front and rear walls of the second socket and face toward the first socket, and an outer side wall arranged to interconnect the front and rear walls of the second socket and lie in spaced-apart relation to the inner side wall of the second socket to define the post-receiving channel of the second socket therebetween, and wherein the second armrest is coupled to the outer side wall of the second socket.

24. The seat of claim 22, further comprising a retainer coupled to the first post and arranged to mate with a retainer flange coupled to the front wall of the first socket to retain the upper seat back in the upright seat-forming position relative to the seat bottom.

25. The seat of claim 22, further comprising a retainer coupled to the first post and arranged to mate with a retainer flange provided on the rear wall of the first socket to retain the upper seat back in the upright seat-forming position relative to the seat bottom.

26. The seat of claim 22, further comprising an anchor located in the post-receiving channel formed in the first socket and coupled to the first post and to the front wall of the first socket to retain the upper seat back in the upright seat-forming position relative to the seat bottom.

27. A juvenile vehicle seat comprising a seat base formed to include a seat bottom and a first socket located in a fixed position relative to the seat bottom, the first socket being formed to include a post-receiving channel and a socket wall bordering the post-receiving channel and providing a bottom edge defining a retainer flange, a backrest including a seat back and a first post coupled to the seat back and arranged to extend into the post-receiving channel formed in the first socket to orient the seat back in an upright fixed seat-forming position relative to the seat bottom, and anchor means for anchoring the first post in the post-receiving channel formed in the first socket to retain the seat back in the upright fixed seat-forming position, wherein the anchor means includes a retainer coupled to the first post and arranged to mate with the retainer flange in a position under the socket wall bordering the post-receiving channel to block removal of the first post from the post-receiving channel formed in the first socket without blocking insertion of the first post into the post-receiving channel.

28. The seat of claim 27, wherein the seat back further includes a downwardly facing wall extending outwardly from the first post and the seat base further includes an upwardly facing surface arranged to mate with the downwardly facing wall extending outwardly from the first post upon movement of the first post in the post-receiving channel formed in the first socket to cause the retainer coupled to the first post to mate with the retainer flange included in the first socket.

29. The seat of claim 28, wherein the seat back includes a front surface facing toward a front edge of the seat bottom and the downwardly facing wall included in the seat back extends between the first post and the front surface of the seat back.

30. The seat of claim 27, wherein the first socket includes a top wall having a top perimeter edge defining a top aperture opening into the post-receiving channel and receiving the first post therein during insertion of the first post into the post-receiving channel, the bottom edge defines a bottom aperture opening into the post-receiving channel and is arranged to lie in spaced-apart relation to the top perimeter edge, and the seat back further includes a downwardly facing wall arranged to mate with the top wall of the first socket upon movement of the first post in the post-receiving channel formed in the first socket to cause the retainer coupled to the first post to mate with the retainer flange included in the first socket.

* * * * *